US012677997B1

(12) United States Patent
Lin et al.

(10) Patent No.: US 12,677,997 B1
(45) Date of Patent: Jul. 14, 2026

(54) TOWEL HEATING BARREL

(71) Applicant: Guangzhou Hansong Tuojiang Technology Co., Ltd., Guangzhou (CN)

(72) Inventors: Zhenji Lin, Guangzhou (CN); Yueqing Li, Guangzhou (CN)

(73) Assignee: Guangzhou Hansong Tuojiang Technology Co., Ltd., Guangzhou (CN)

( * ) Notice: Subject to any disclaimer, the term of this patent is extended or adjusted under 35 U.S.C. 154(b) by 0 days.

(21) Appl. No.: 19/387,708

(22) Filed: Nov. 13, 2025

Related U.S. Application Data

(63) Continuation-in-part of application No. 30/022,934, filed on Sep. 12, 2025.

(30) Foreign Application Priority Data

| | | |
|---|---|---|
| Sep. 2, 2025 | (CN) | 202530522408.4 |
| Sep. 18, 2025 | (CN) | 202522013692.X |
| Sep. 18, 2025 | (CN) | 202522013698.7 |
| Sep. 18, 2025 | (CN) | 202522013705.3 |

(51) Int. Cl.
*A47K 10/02* (2006.01)
*H05B 3/56* (2006.01)

(52) U.S. Cl.
CPC ............. *A47K 10/025* (2013.01); *H05B 3/56* (2013.01)

(58) Field of Classification Search
CPC ...... A47B 43/04; A47B 47/06; A47K 10/025; H05B 3/56
USPC ........................................ 312/34.1, 3, 4, 5, 6
See application file for complete search history.

(56) References Cited

U.S. PATENT DOCUMENTS

| | | | | |
|---|---|---|---|---|
| 1,192,091 A * | 7/1916 | Miller | B65D 15/22 | 220/9.1 |
| 3,190,012 A * | 6/1965 | Gray | D06F 58/14 | 34/91 |
| 6,142,589 A * | 11/2000 | Wang | A47B 47/00 | 312/3 |
| 8,276,999 B2 * | 10/2012 | Hassman | A47B 43/00 | 108/158.11 |
| 11,583,072 B2 * | 2/2023 | Brincat | A47B 47/0083 | |
| 2009/0084772 A1 * | 4/2009 | Hsiao | A47K 10/06 | 219/385 |
| 2025/0082138 A1 * | 3/2025 | Zhao | D06F 58/14 | |

FOREIGN PATENT DOCUMENTS

| | | | |
|---|---|---|---|
| KR | 20-2012-0008119 | * 11/2012 | A47B 43/04 |

* cited by examiner

*Primary Examiner* — James O Hansen

(57) ABSTRACT

A towel heating barrel includes a fixing member, a flexible enclosure, and a plurality of support rods. The flexible enclosure is connected to the fixing member. At least a portion of the flexible enclosure is flexible and has a folded state and an unfolded state. When the flexible enclosure is in the unfolded state, a first accommodation cavity is formed in the flexible enclosure. Each of the plurality of support rods is detachably connected to the fixing member or the flexible enclosure. At least a portion of each of the plurality of support rods is configured to be arranged in the first accommodation cavity, and the plurality of support rods are configured to keep the flexible enclosure in the unfolded state.

9 Claims, 20 Drawing Sheets

TOWEL HEATING BARREL

CROSS REFERENCE TO RELATED APPLICATIONS

This application is a continuation-in-part of the US patent application No. 30/022,934, filed on Sep. 12, 2025, and claims priority to the Chinese patent application No. 202522013692.X, filed on Sep. 18, 2025, the Chinese patent application No. 202522013698.7, filed on Sep. 18, 2025, the Chinese patent application No. 202522013705.3, filed on Sep. 18, 2025, the Chinese patent application No. 202530522408.4, filed on Sep. 2, 2025, the disclosure of which are incorporated by reference herein in its entirety.

FIELD OF THE DISCLOSURE

The present disclosure relates to the field of towel heating, in particular to a towel heating barrel.

BACKGROUND

Existing towel heating barrels often use rigid outer shells to maintain a fixed external shape and prevent a loose and unattractive appearance. However, rigid outer shells are correspondingly more expensive to manufacture and are difficult to fold for storage.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, a towel heating barrel is disclosed. The towel heating barrel includes a fixing member, a flexible enclosure, and a plurality of support rods. The flexible enclosure is connected to the fixing member. At least a portion of the flexible enclosure is flexible and has a folded state and an unfolded state. When the flexible enclosure is in the unfolded state, a first accommodation cavity is formed in the flexible enclosure. Each of the plurality of support rods is detachably connected to the fixing member or the flexible enclosure. At least a portion of each of the plurality of support rods is configured to be arranged in the first accommodation cavity, and the plurality of support rods are configured to keep the flexible enclosure in the unfolded state.

BRIEF DESCRIPTION OF THE DRAWINGS

Illustrative embodiments of the present disclosure are described in detail below with reference to the attached drawing figures.

Numeral reference in the drawings.

Figure 1:
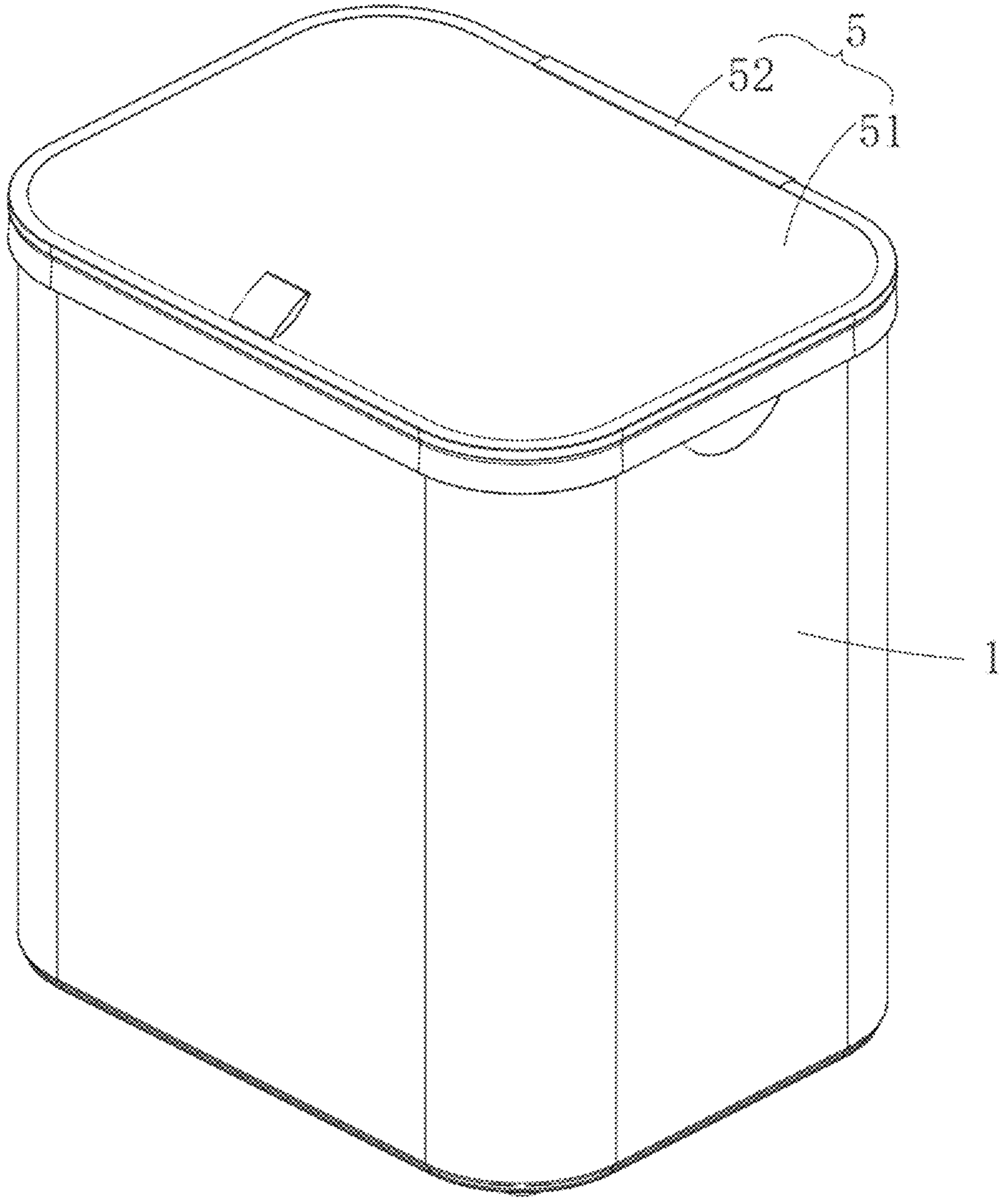
FIG. 1 is a schematic view of an overall structure of a towel heating barrel according to an embodiment of the present disclosure.

- 1—outer container; 100—first accommodation cavity; 101—first opening; 11—fixing frame; 12—flexible enclosure; 111—fixing member; 112—support rod; 120—connection port; 121—base plate; 122—enclosing member; 123—first connection portion; 1211—support body; 1212—outer wrapping member; 1110—clamping gap; 1111—first clamping portion; 1112—second clamping portion; 1113—locking member; 1114—first engagement member; 1115—second engagement member; 11110—fixing hole; 11120—accommodation groove; 11131—fixing pin; 11132—locking cap; 11141—extension portion; 11142—first engagement portion; 11151—engagement groove; 11152—second engagement portion;
- 2—inner container; 200—second accommodation cavity; 201—second opening; 21—thermal insulation layer; 22—outer flexible layer;
- 3—heating mechanism; 30—electrical connection portion; 31—electric heating wire;

4—hanging assembly; 41—fastening member; 42—hanging member;

5—top cover; 51—cover body; 52—second connection part; 511—cover plate; 512—edge wrapping member; 513—lifting member;

6—rod sleeve; 600—receiving cavity; 601—inlet/outlet;

7—anti-detachment member.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms “including” and “having”, as well as their variants, are intended to convey a non-exclusive inclusion. The terms “first”, “second”, etc., as used herein, are intended to distinguish between different objects, rather than to describe a particular order.

Reference to “embodiments” herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

Referring to FIGS. 1 to 20, the present disclosure provides a towel heating barrel. The towel heating barrel may include an outer container 1, an inner container 2, and a heating mechanism 3.

A first accommodation cavity 100 may be formed in the outer container 1. The inner container 2 may be detachably connected to the outer container 1, so that the inner container 2 may be arranged in the first accommodation cavity 100 or separated from the first accommodation cavity 100. A second accommodation cavity 200 may be formed in the inner container 2, and the second accommodation cavity 200 may be used for placing towels to be heated. The heating mechanism 3 may be at least mounted to the inner container 2 and may heat the second accommodation cavity 200, i.e., heat the towels.

Therefore, the towel heating barrel may at least implement a towel heating function by the inner container 2, and the outer container 1 may be arranged to cover an outer periphery of the inner container 2, so that the inner container 2 may not need to be exposed. The inner container 2 may only need to meet thermal insulation performance, and aesthetic requirements for the inner container 2 may be greatly reduced, that is, the design and manufacture of the inner container 2 may be simpler. Furthermore, functions of the outer container 1 and the inner container 2 may be independent of each other. It may be sufficient for the inner container 2 to meet thermal insulation requirements, so a selection of material and structure for the outer container 1 may have lower requirements for thermal insulation, allowing the outer container 1 to be implemented with a simpler solution under a premise of aesthetic design. Similarly, due to a mutual independence between the outer container 1 and the inner container 2, after the inner container 2 is removed from the outer container 1, the outer container 1, which has a capacity greater than a capacity of the inner container 2, may be used alone to store towels.

Figure 2:
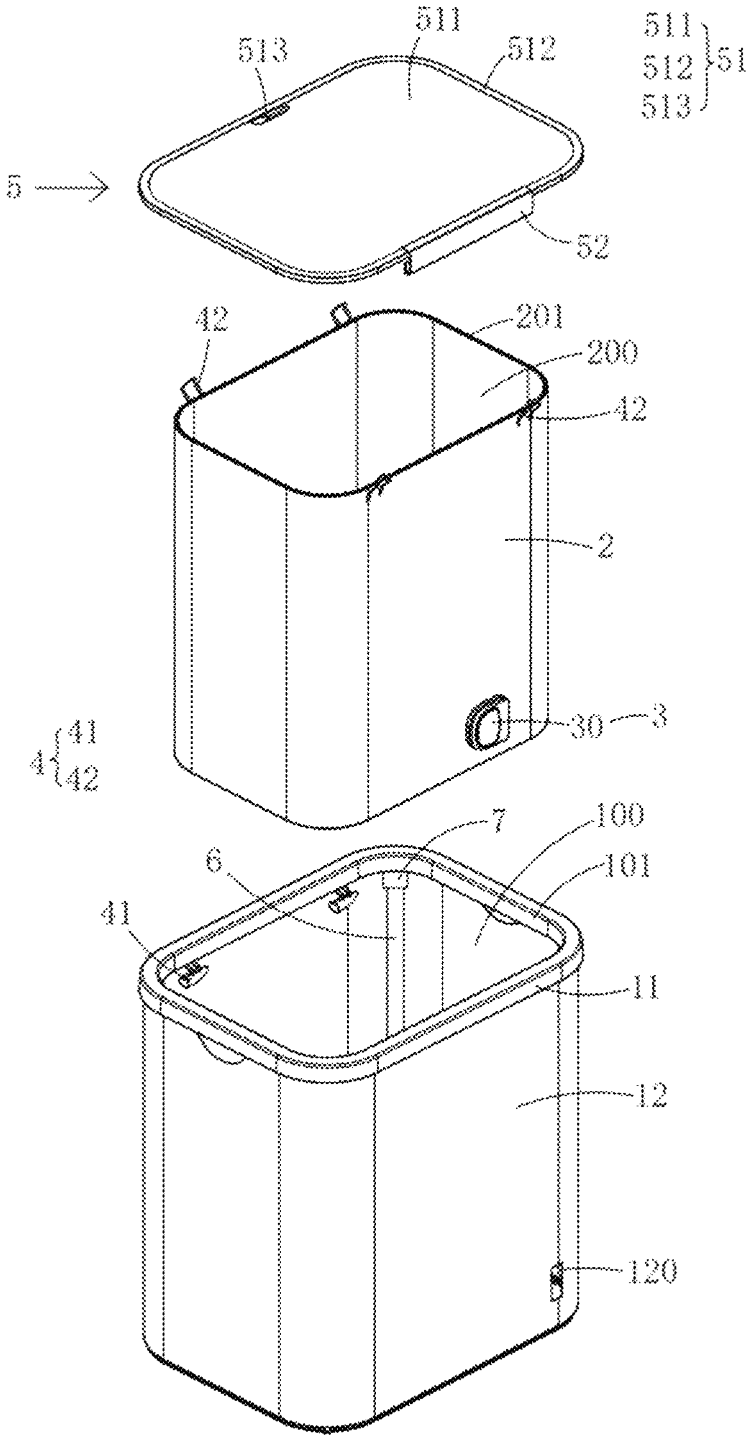
FIG. 2 is an exploded view I of the towel heating barrel according to an embodiment of the present disclosure.
Figure 7:
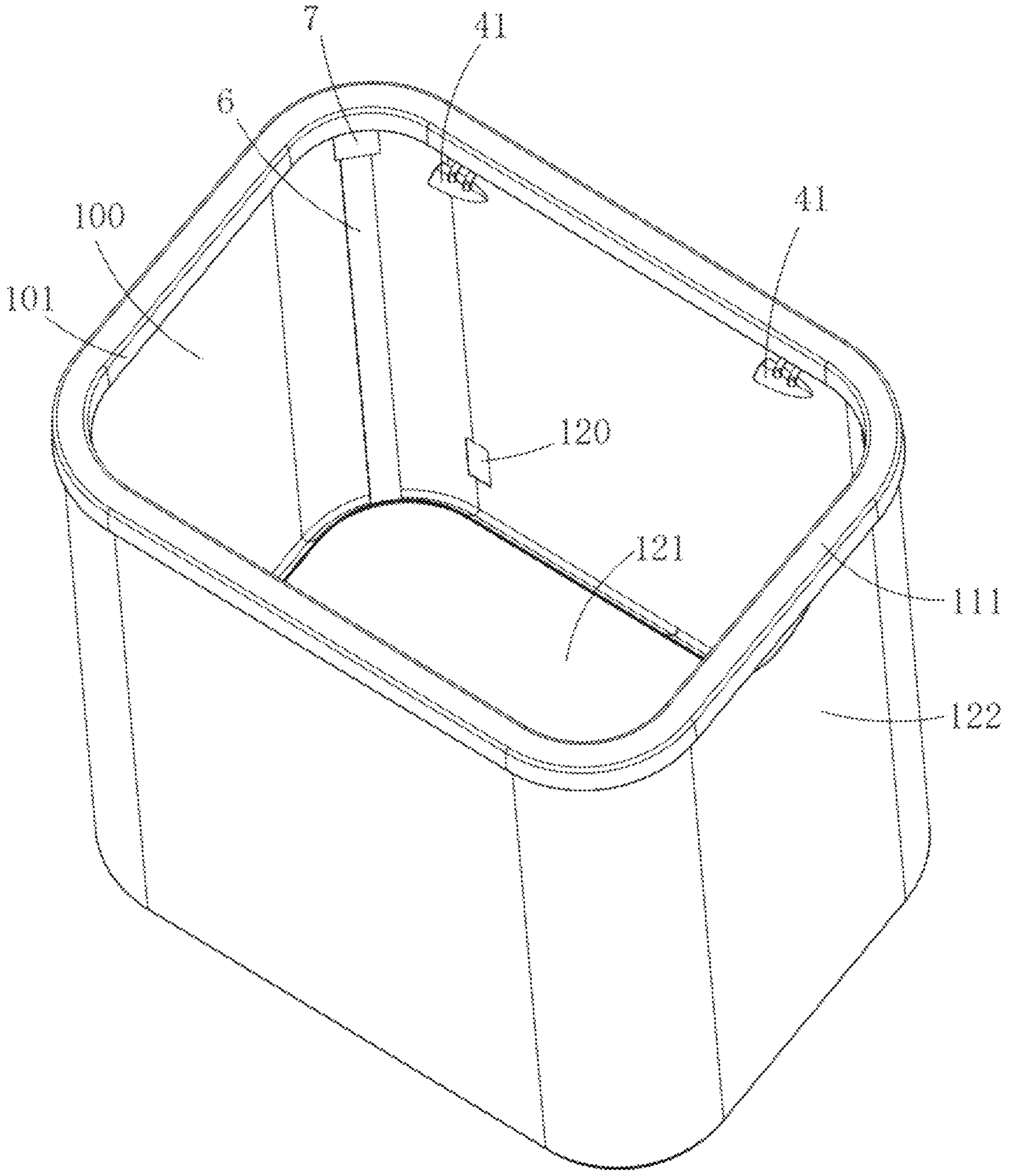
FIG. 7 is a structural view of the outer container according to an embodiment of the present disclosure.
Figure 8:
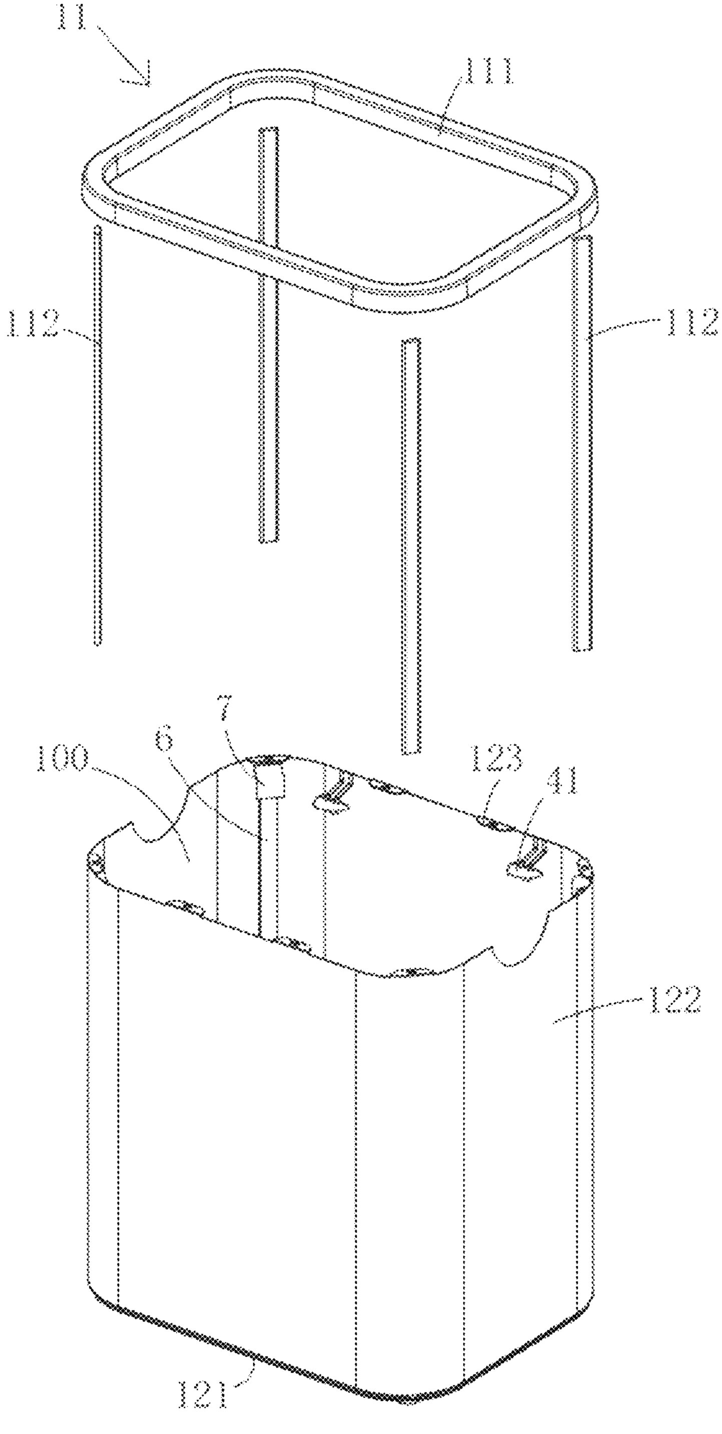
FIG. 8 is an exploded view of the outer container according to an embodiment of the present disclosure.

Details may be as follows:

In some embodiments, at least a portion of the outer container 1 may be rigid so as to at least perform a support function. Referring to FIGS. 2, 7, and 8, the outer container 1 may include a fixing frame 11 and a flexible enclosure 12. The fixing frame 11 may be rigid, and the fixing frame 11 may be made of plastic, metal, wood, bamboo, etc. At least a portion of the flexible enclosure 12 may be flexible, and the flexible enclosure 12 may have a folded state and an unfolded state. The fixing frame 11 may serve as a skeleton of the outer container 1, and the flexible enclosure 12 may be connected to the fixing frame 11, particularly to an outer side of the fixing frame 11, so that the flexible enclosure 12 may be unfolded by the fixing frame 11 and maintained in the unfolded state, forming the first accommodation cavity 100 in the flexible enclosure 12. The inner container 2 may be detachably connected to the fixing frame 11 or the flexible enclosure 12. After the inner container 2 the outer container 1 are mounted to each other, the inner container 2 may be located in the first accommodation cavity 100, then an appearance of the inner container 2 may be blocked by the outer container 1, and what the user may observe may be only an appearance of the outer container 1. Since the flexible enclosure 12 is free from a constraint of the heating mechanism 3, a requirement for thermal insulation performance may be reduced, and a more economical shape design can be adopted. For a structure of the outer container 1, except for the fixing frame 11 which is rigid, the flexible enclosure 12 may be made of some lower-cost flexible materials, such as single-layer fabric. Flexible materials may more easily achieve a folding effect. Thus, it can be seen that a detachable structural design of the inner container 2 and the outer container 1 may achieve a purpose of simple manufacturing and cost control while maintaining an aesthetic appearance of the towel heating barrel.

Figure 12:
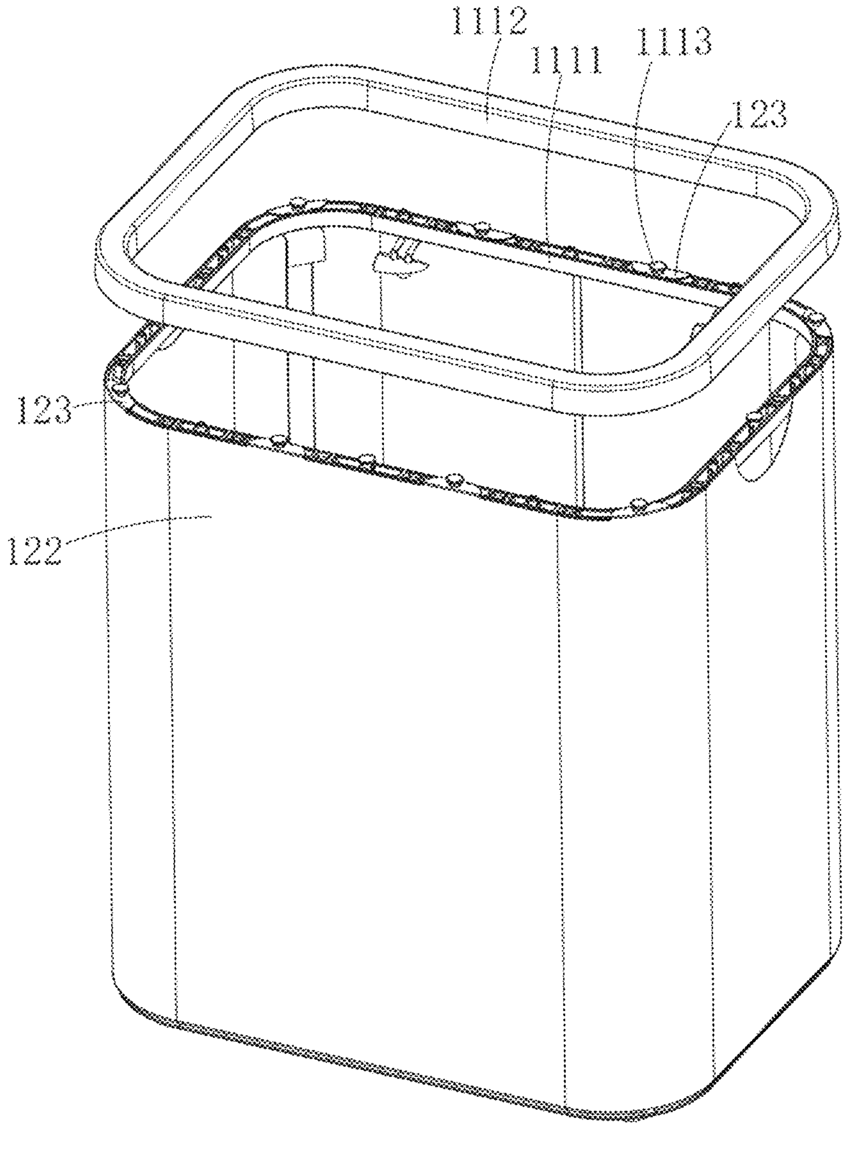
FIG. 12 is a schematic view of connection structures of a flexible enclosure and a fixing member according to an embodiment of the present disclosure.

To save storage space and reduce transportation costs, in some embodiments, referring to FIGS. 8 and 12, the flexible enclosure 12 and the fixing frame 11 may be detachably connected with each other, and the fixing frame 11 may also adopt a detachable structural design. Since the inner container 2 does not need to provide support, at least a portion of the inner container 2 may be flexible, allowing the inner container 2 to be folded or compressed. After the inner container 2 is removed from the outer container 1, the user may also remove the flexible enclosure 12 from the fixing frame 11, put the flexible enclosure 12 into the folded state, and disassemble the fixing frame 11, thereby achieving the purpose of saving space.

In some embodiments, as shown in FIGS. 2 and 7, a connection port 120 may be formed on the flexible enclosure 12, and the first accommodation cavity 100 and an exterior of the flexible enclosure 12 may be communicated with each other by the connection port 120. The heating mechanism 3 may include an electric heating wire 31 and an electrical connection portion 30 connected to the electric heating wire 31. The electric heating wire 31 may be arranged in the inner container 2, and the electrical connection portion 30 may be arranged on an outer face of the inner container 2. A position of the electrical connection portion 30 may correspond to the connection port 120. The electrical connection portion 30 may be connected to a power cord. The power cord may pass through the connection port 120 and then be connected to an external power source, so that the electric heating wire 31 may be energized for heating. When the inner container 2 needs to be removed from the outer container 1, first separate the power cord from the electrical connection portion 30, and then take the inner container 2 out of the first accommodation cavity 100.

Figure 20:
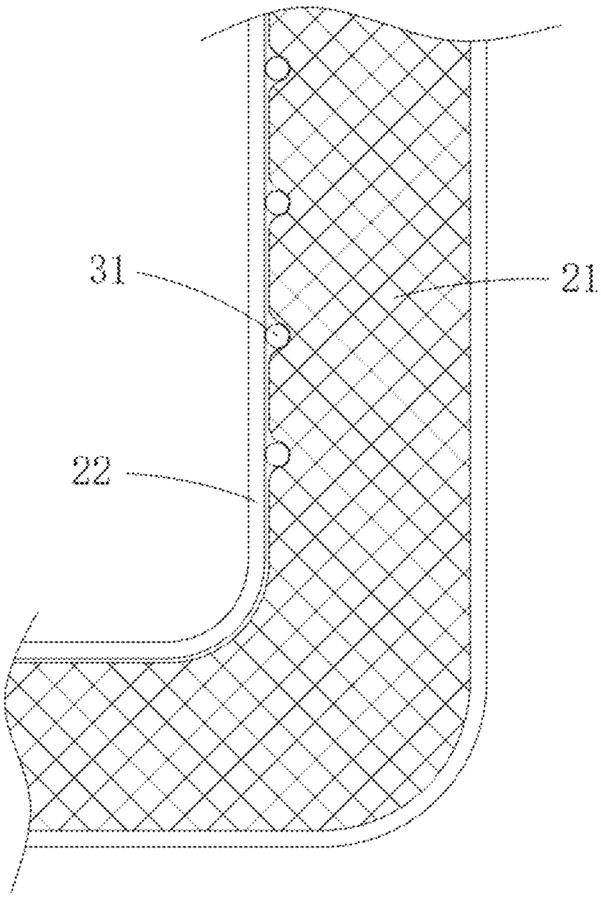
FIG. 20 is a schematic view of a hierarchical structure of the inner container according to an embodiment of the present disclosure.

In some embodiments, referring to FIG. 20, the inner container 2 may include a thermal insulation layer 21 and an outer flexible layer 22 wrapping the thermal insulation layer 21. The electric heating wire 31 may be arranged between the thermal insulation layer 21 and the outer flexible layer 22. A material of the thermal insulation layer 21 may be, for example, thermal insulation cotton, and a material of the outer flexible layer 22 may be, for example, fabric, leather. To maintain a spatial capacity of the second accommodation cavity 200, an additional rigid layer may also be arranged between the thermal insulation layer 21 and the outer flexible layer 22.

Figure 4:
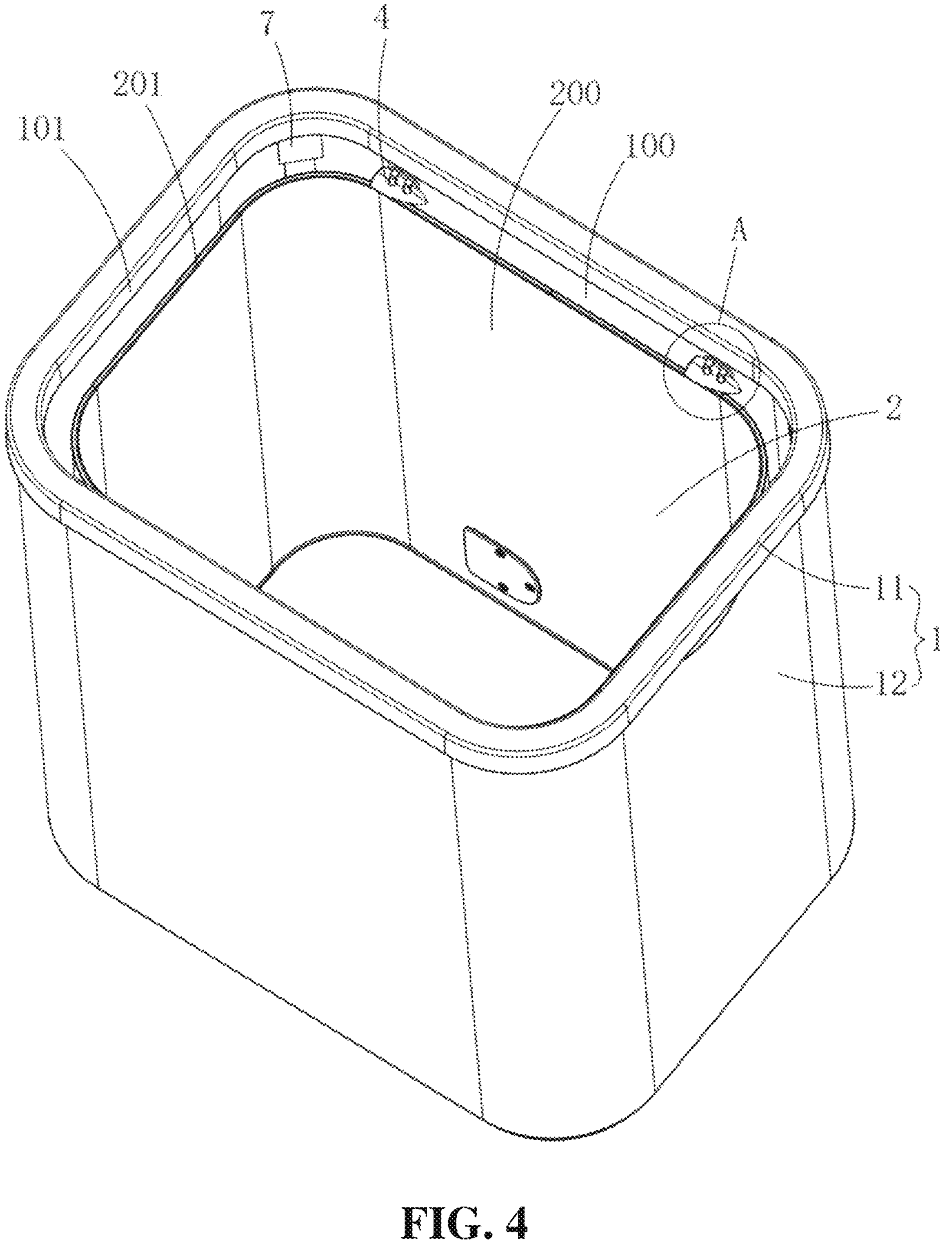
FIG. 4 is a structural view of an inner container and an outer container according to an embodiment of the present disclosure, with the inner container and the outer container connected with each other.
Figure 5:
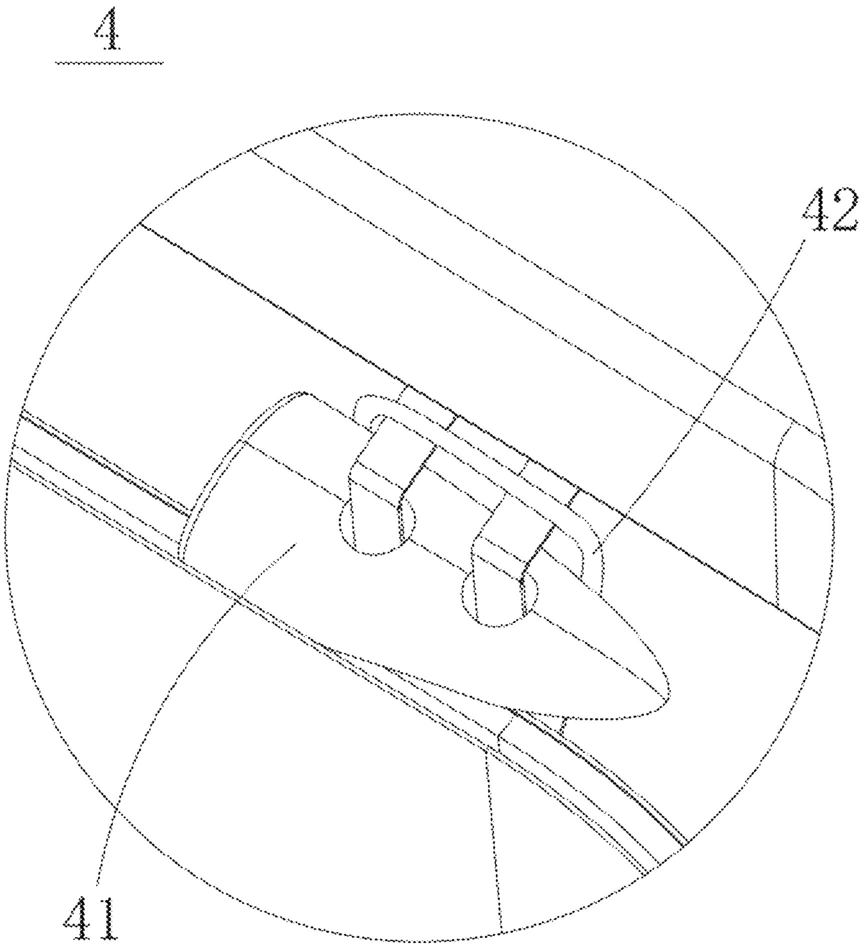
FIG. 5 is an enlarged view of a portion A in FIG. 4.

Regarding the detachable connection between the inner container 2 and the outer container 1, in some embodiments, referring to FIGS. 2, 4, and 5, the towel heating barrel may further include at least one hanging assembly 4. The inner container 2 may be detachably connected to the outer container 1 through the at least one hanging assembly 4.

Specifically, the hanging assembly 4 may include a fastening member 41 and a hanging member 42. The fastening member 41 may be mounted to one of the inner container 2 and the outer container 1, and the hanging member 42 may be mounted to the other of the inner container 2 and the outer container 1. The fastening member 41 may hook on the hanging member 42.

Furthermore, a plurality of hanging assemblies 4 may be provided, and the plurality of hanging assemblies 4 may be symmetrically distributed in the towel heating barrel. For example, as shown in FIG. 2, four fastening members 41 may be distributed in the outer container 1, with each fastening member 41 arranged close to a respective one of four corners of the outer container 1, and four hanging members 42 may be distributed on the inner container 2, with each hanging member 42 arranged close to a respective one of four corners of the inner container 2.

In some embodiments, such as those shown in FIGS. 2 and 5, the fastening member 41 may be a horn button, and the horn button may be connected to the flexible enclosure 12 via a flexible strap. The hanging member 42 may be a flexible hanging ear, and the flexible hanging ear may be connected to an outer flexible layer of the inner container 2. The horn button, along with the flexible strap, may pass through the flexible hanging ear, and a weight of the inner container 2 may cause the horn button to be hooked on the flexible hanging ear.

In other embodiments, for example, the fastening member 41 may be a rigid hook fixedly mounted to the fixing frame 11. The hanging member 42 may be a rigid hanging ear fixed on the outer flexible layer 22 of the inner container 2. The weight of the inner container 2 may cause the horn button to be hooked on the rigid hanging ear.

Regarding a detachable structural design of the fixing frame 11, in some embodiments, referring to FIGS. 6 to 11, the fixing frame 11 may include a fixing member 111 and a plurality of support rods 112. The flexible enclosure 12 may be connected to the fixing member 111. At least a portion of the flexible enclosure 12 may be flexible, and the flexible enclosure 12 may have a folded state and an unfolded state. When the flexible enclosure 12 is in the unfolded state, the first accommodation cavity 100 may be formed in the flexible enclosure 12. The plurality of support rods 112 may be detachably connected to the fixing member 111 or the flexible enclosure 12. The support rods 112 may at least partially be arranged in the first accommodation cavity 100 to keep the flexible enclosure 12 in the unfolded state. The fixing member 111 and the support rods 112 may cooperatively form the fixing frame 11, and then the flexible enclosure 12 may partially cover the fixing frame 11, thereby forming an outer container 1 that may be detachable, foldable, and simple to manufacture. The fixing member 111 and the support rods 112 may be made of plastic, bamboo, wood, metal, or other materials.

Figure 6:
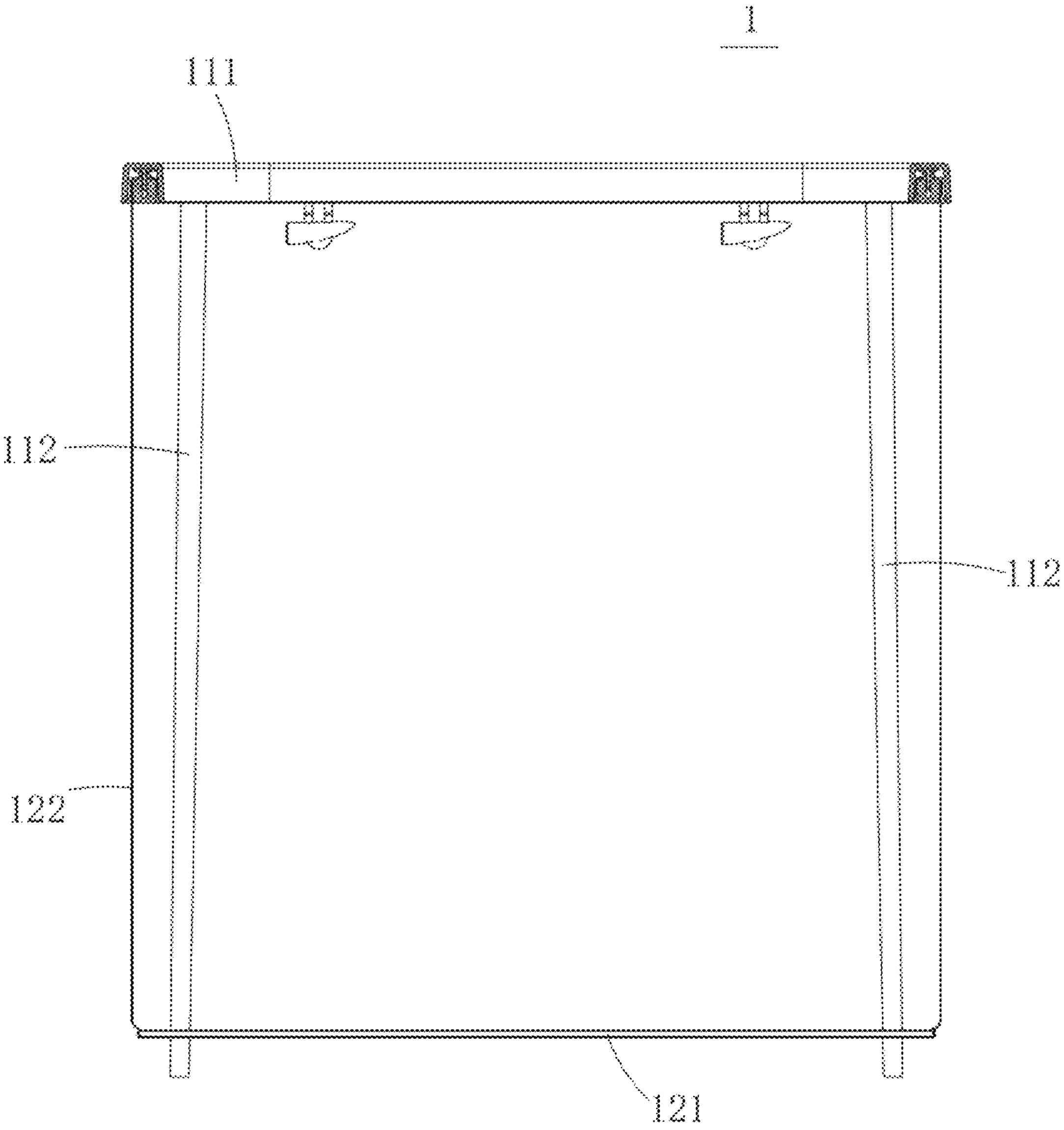
FIG. 6 is a cross-sectional view of the outer container according to an embodiment of the present disclosure.

For example, in some embodiments, referring to FIG. 6, an upper end of each support rod 112 may be inserted and fixed to a lower side of the fixing member 111 (an insertion structure of the two is not shown). The flexible enclosure 12 may include a base plate 121 and an enclosing member 122. The enclosing member 122 may be connected to the fixing member 111 and the base plate 121. Correspondingly, the aforementioned connection port 120 may be formed on the enclosing member 122. The enclosing member 122 may be arranged to surround the plurality of support rods 112, that is, the plurality of support rods 112 may stretch open the enclosing member 122. A lower end of the support rod 112 may penetrate the base plate 121 and may directly bear against the ground.

Figure 9:
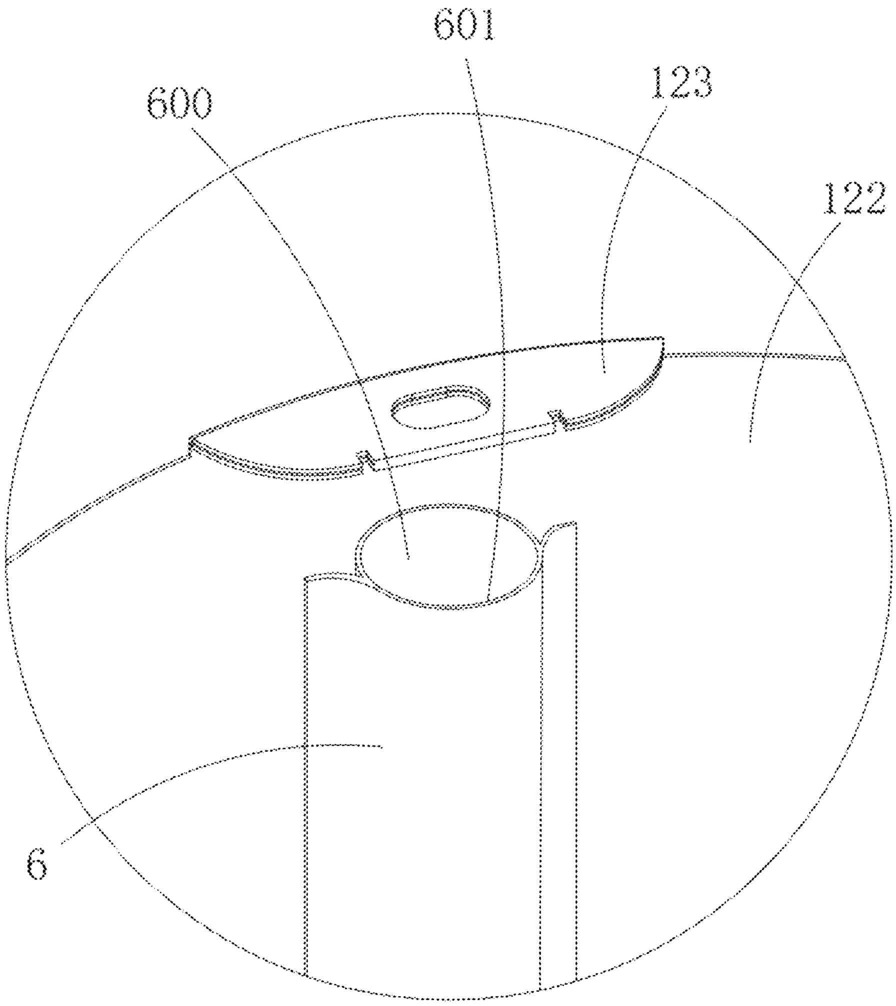
FIG. 9 is a schematic view of connection structures of a rod sleeve and the enclosing member according to an embodiment of the present disclosure.
Figure 10:
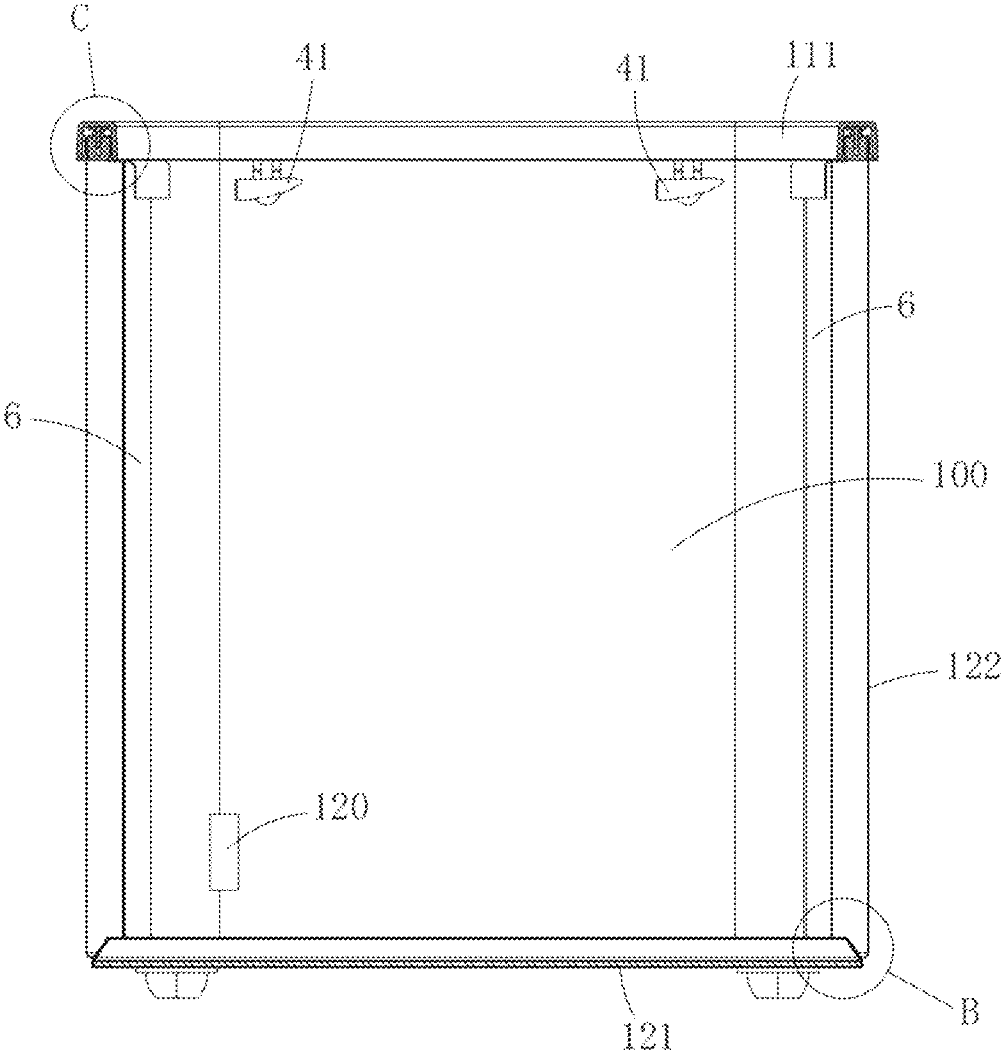
FIG. 10 is a cross-sectional view of the outer container according to another embodiment of the present disclosure.

For example, in other embodiments, referring to FIGS. 8 to 10, the support rod 112 may be fixed to the flexible enclosure 12. The flexible enclosure 12 may include a base plate 121 and an enclosing member 122. The enclosing member 122 may be flexible and foldable (e.g., fabric), while the base plate 121 may be either rigid or flexible. The enclosing member 122 may be connected to the fixing member 111 and the base plate 121. Correspondingly, the aforementioned connection port 120 may be formed on the enclosing member 122. The support rod 112 may be detachably connected to the enclosing member 122, and when all of the plurality of support rods 112 are connected to the enclosing member 122, the flexible enclosure 12 may be in the unfolded state. An upper end of the support rod 112 may abut against the fixing member 111, and a lower end of the support rod 112 may abut against the base plate 121. The base plate 121 or support feet arranged on a bottom face of the base plate 121 may be arranged to bear against the ground. A length of the support rod 112 may be approximately equal to a distance between the fixing member 111 and the base plate 121, so that after mounting of the plurality of support rods 112 is completed, a deformation space of the enclosing member 122 is small, which may prevent large mutual displacement between the fixing member 111 and the base plate 121.

Correspondingly, the aforementioned fastening member 41 may be sewn to the enclosing member 122, and the hanging member 42 may be sewn to an outer wall of the inner container 2.

The detachable connection between the fixing frame 11 and the flexible enclosure 12 may revolve a detachable connection between the enclosing member 122 and the support rod 112, and a detachable connection between the fixing member 111 and the enclosing member 122.

In some embodiments where the support rods 112 are detachably connected to the enclosing member 122, referring to FIGS. 7 to 9, the towel heating barrel may further include a plurality of rod sleeves 6. The number of rod sleeves 6 may correspond to the number of support rods 112. The rod sleeves 6 may be connected to the enclosing member 122. Each rod sleeve 6 and the enclosing member 122 may cooperatively define a receiving cavity 600, or the receiving cavity 600 may only be formed by a respective rod sleeve 6. Each support rod 112 may be arranged in a corresponding receiving cavity 600. For example, in some embodiments, the rod sleeve 6 may be arranged as a sheet-like fabric structure. For example, in other embodiments, the rod sleeve 6 may be arranged as a tubular fabric structure. The rod sleeve 6 may be directly sewn to the enclosing member 122, or may be connected to the enclosing member 122 by a hook-and-loop fastener.

Figure 11:
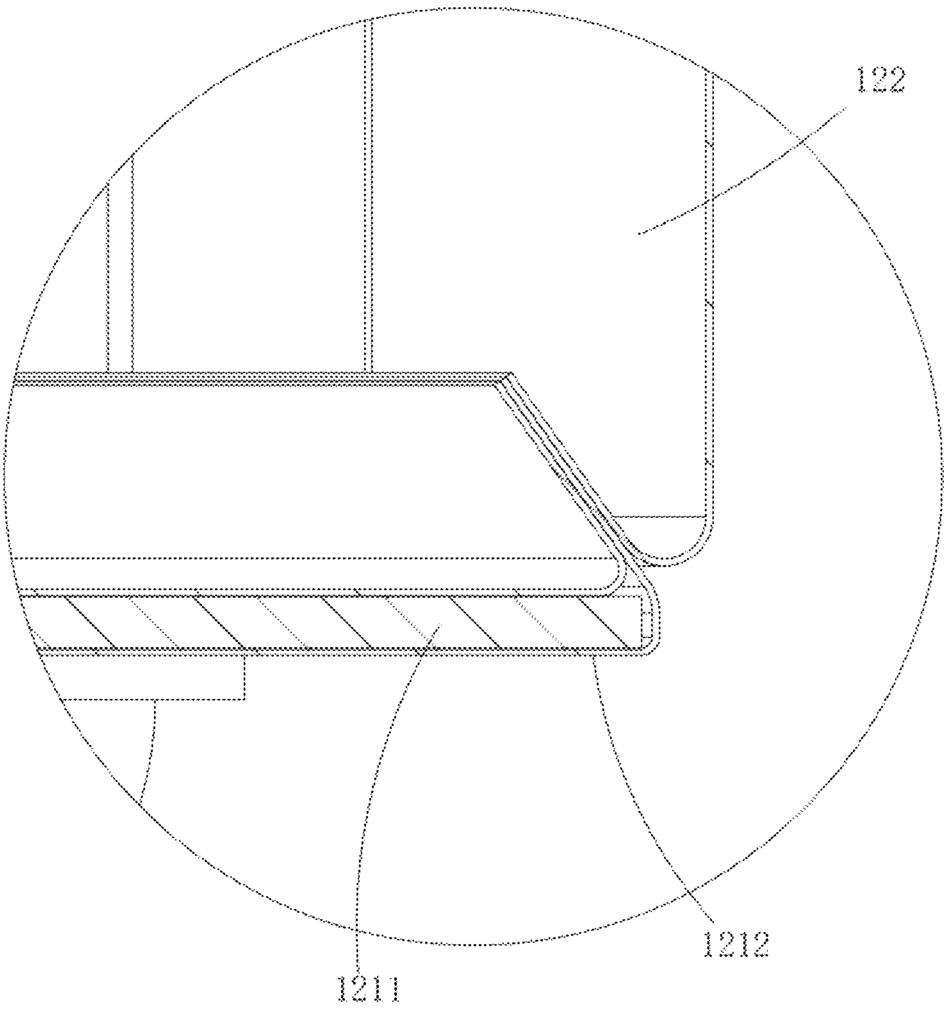
FIG. 11 is an enlarged view of a portion B in FIG. 10.

In some embodiments, referring to FIG. 11, the base plate 121 may include a support body 1211 and an outer wrapping member 1212 wrapping the support body 1211. The support body 1211 may be made of plastic, wood, bamboo, or metal, etc. The outer wrapping member 1212 may be fabric or other flexible materials. The enclosing member 122 and the outer wrapping member 1212 may be sewn to each other. Of course, in other embodiments, the support body 1211 may also be thermal insulation cotton.

To facilitate folding and storage of the outer container 1, in some embodiments, referring to FIG. 9, the support rod 112 may be taken out from the receiving cavity 600. Specifically, an inlet/outlet 601 communicated with the receiving cavity 600 may be formed at an upper end of the rod sleeve 6, and a lower end of the rod sleeve 6 may be sewn to both the outer wrapping member 1212 and the enclosing member 122. As shown in FIG. 8, the towel heating barrel may further include an anti-detachment member 7. One end of the anti-detachment member 7 may be connected to the fixing member 111 or the flexible enclosure 12, and the other end of the anti-detachment member 7 may be movable and detachably connected to the rod sleeve 6 to open or cover the inlet/outlet 601. In some embodiments, an upper end of the anti-detachment member 7 may be sewn to the enclosing member 122, and a lower end of the anti-detachment member 7 may be detachably connected to the rod sleeve 6 by the hook-and-loop fastener.

When each receiving cavity 600 has received a corresponding support rod 112, the base plate 121, the fixing member 111, and the plurality of support rods 112 may cooperatively maintain a shape of the enclosing member 122. The base plate 121 and the fixing member 111 may cooperatively maintain a shape of the upper end of the enclosing member 122 and a shape of the lower end of the enclosing member 122, while the plurality of support rods 112 may cooperatively maintain a relative position between the base plate 121 and the fixing member 111 unchanged, thereby maintaining a tubular shape of the enclosing member 122, causing the flexible enclosure 12 to be in the unfolded state and the first accommodation cavity 100 to be formed in the flexible enclosure 12. The upper end of the support rod 112 may abut against the fixing member 111, and the lower end of the support rod 112 may abut against the base plate 121. The anti-detachment member 7 may be used to prevent the support rod 112 from disengaging from the receiving cavity 600. Finally, the outer container 1 may maintain an upright appearance, for example, the outer container 1 in FIG. 1 has a rectangular barrel structure, and then the inner container 2 may be placed in the first accommodation cavity 100. When it is necessary to fold and store the towel heating barrel, first remove the inner container 2, then separate the anti-detachment member 7 from the rod sleeve 6 to expose the inlet/outlet 601, remove each support rod 112 one by one, and finally fold the enclosing member 122 and the inner container 2.

Regarding the detachable connection between the fixing member 111 and the enclosing member 122, in some embodiments, referring to FIGS. 12 to 19, the fixing member 111 may include a first clamping portion 1111 and a second clamping portion 1112. The first clamping portion 1111 and the second clamping portion 1112 may be detachably connected with each other, and a clamping gap 1110 may be formed between the first clamping portion 1111 and the second clamping portion 1112. The flexible enclosure 12 may further include a first connection portion 123 connected to the enclosing member 122. The first connection portion 123 may be arranged in the clamping gap 1110 and may be clamped and fixed by a cooperation of the first clamping portion 1111 and the second clamping portion 1112. The first connection portion 123 may be formed by extending from a top portion of the enclosing member 122. That is, the first connection portion 123 and the enclosing member 122 may be integrally formed as a one-piece structure. Or, the first connection portion 123 may be sewn to the enclosing member 122.

Therefore, when it is necessary to separate the enclosing member 122 and the fixing member 111, separate the first clamping portion 1111 and the second clamping portion 1112, and then pull the first connection portion 123 out from the clamping gap 1110.

Figure 13:
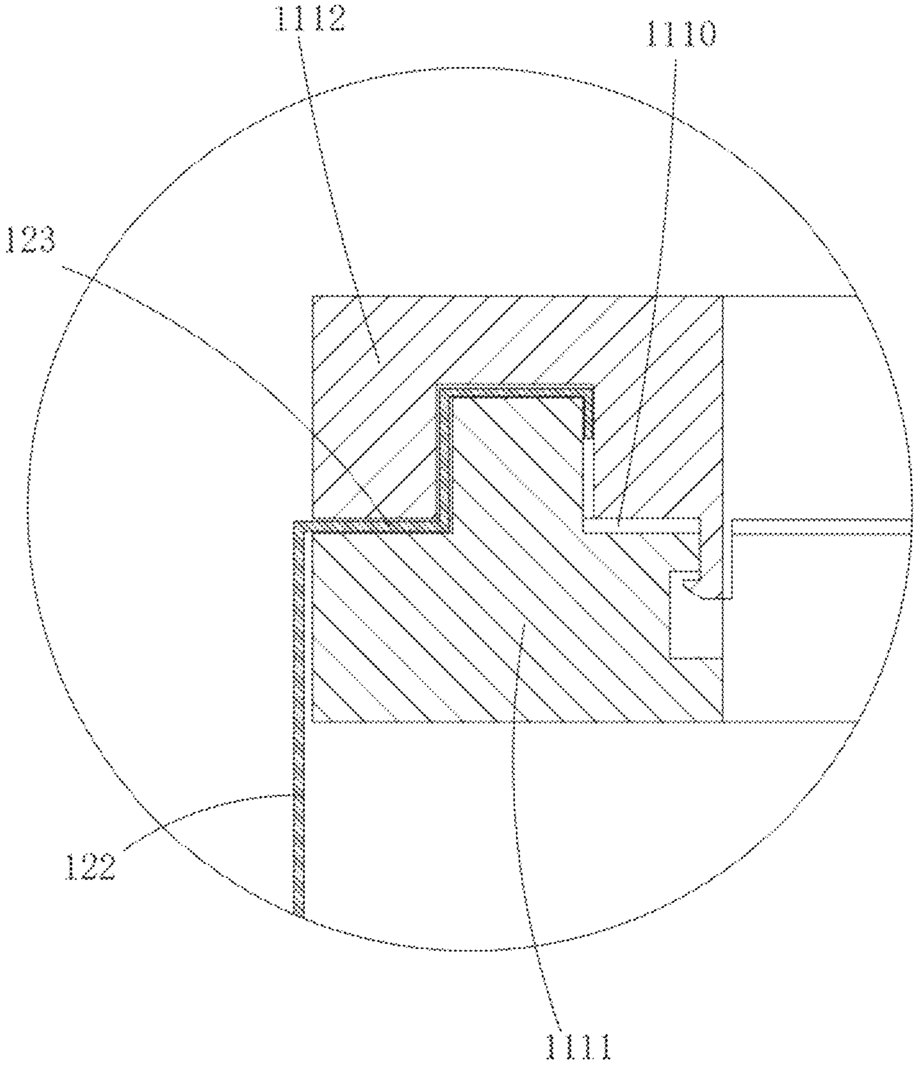
FIG. 13 is a schematic view showing a connection relationship between the fixing member and a first connection portion according to an embodiment of the present disclosure.

In some embodiments, referring to FIG. 13, the first clamping portion 1111 and the second clamping portion 1112 may be connected with each other in a snap-fit manner, and the first connection portion 123 may be clamped and fixed by a cooperation of the first clamping portion 1111 and the second clamping portion 1112.

Figure 14:
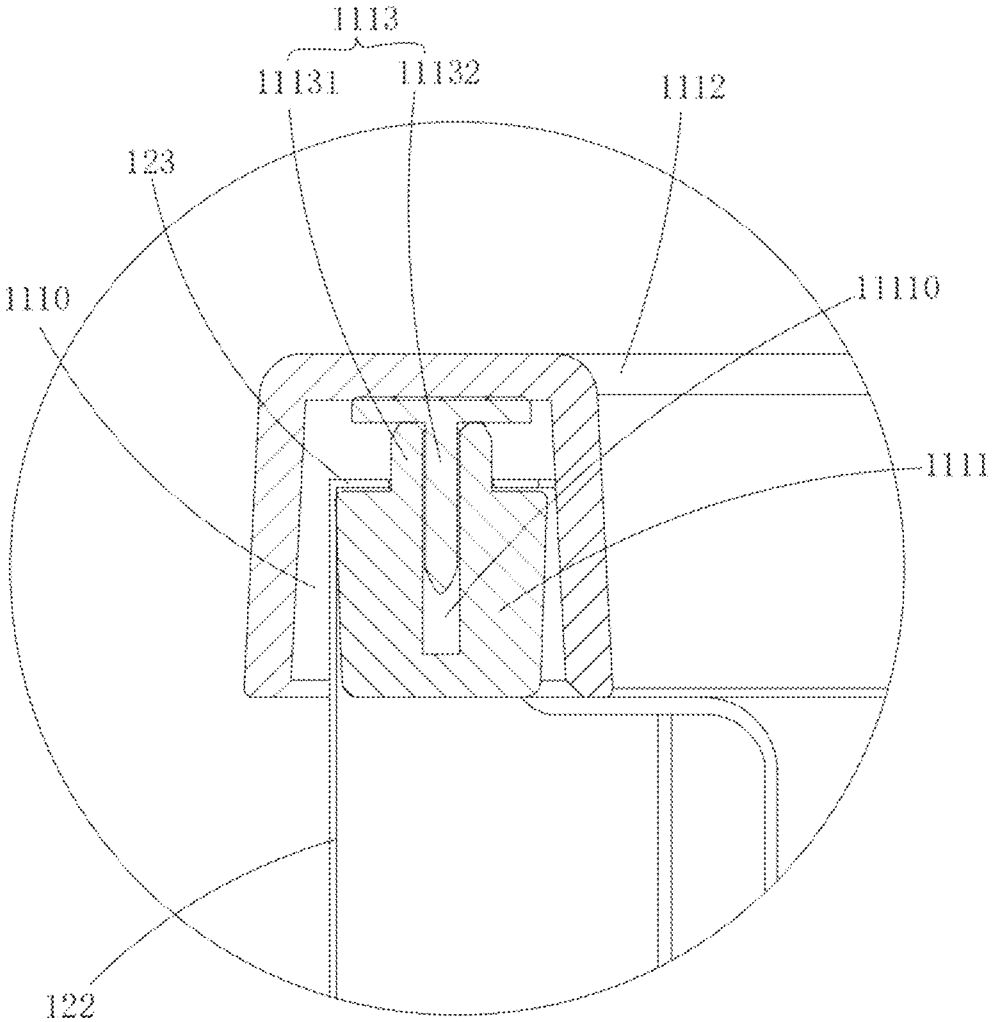
FIG. 14 is an enlarged view of a portion C in FIG. 10, showing another connection relationship between the fixing member and the first connection portion.
Figure 15:
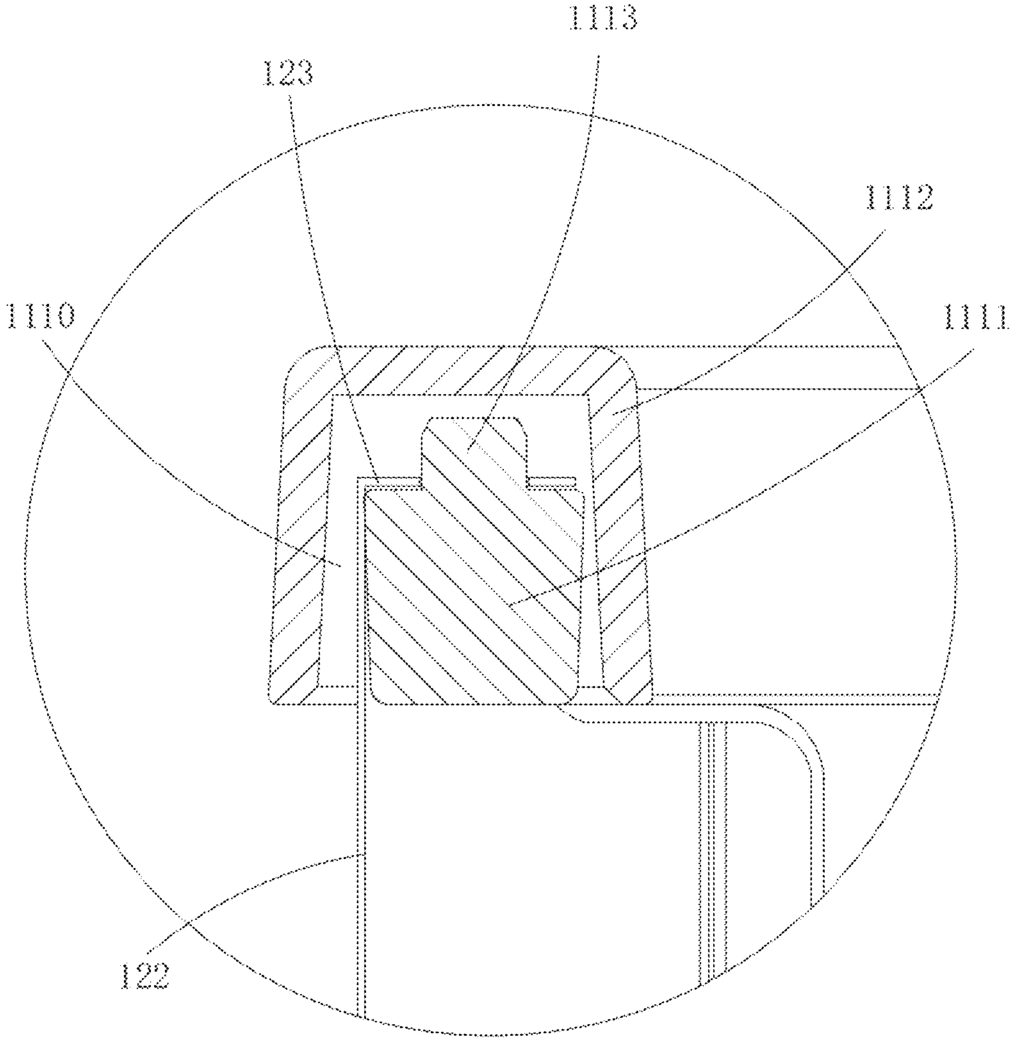
FIG. 15 is a schematic view showing the connection relationship between the fixing member and the first connection portion according to yet another embodiment of the present disclosure.
Figure 16:
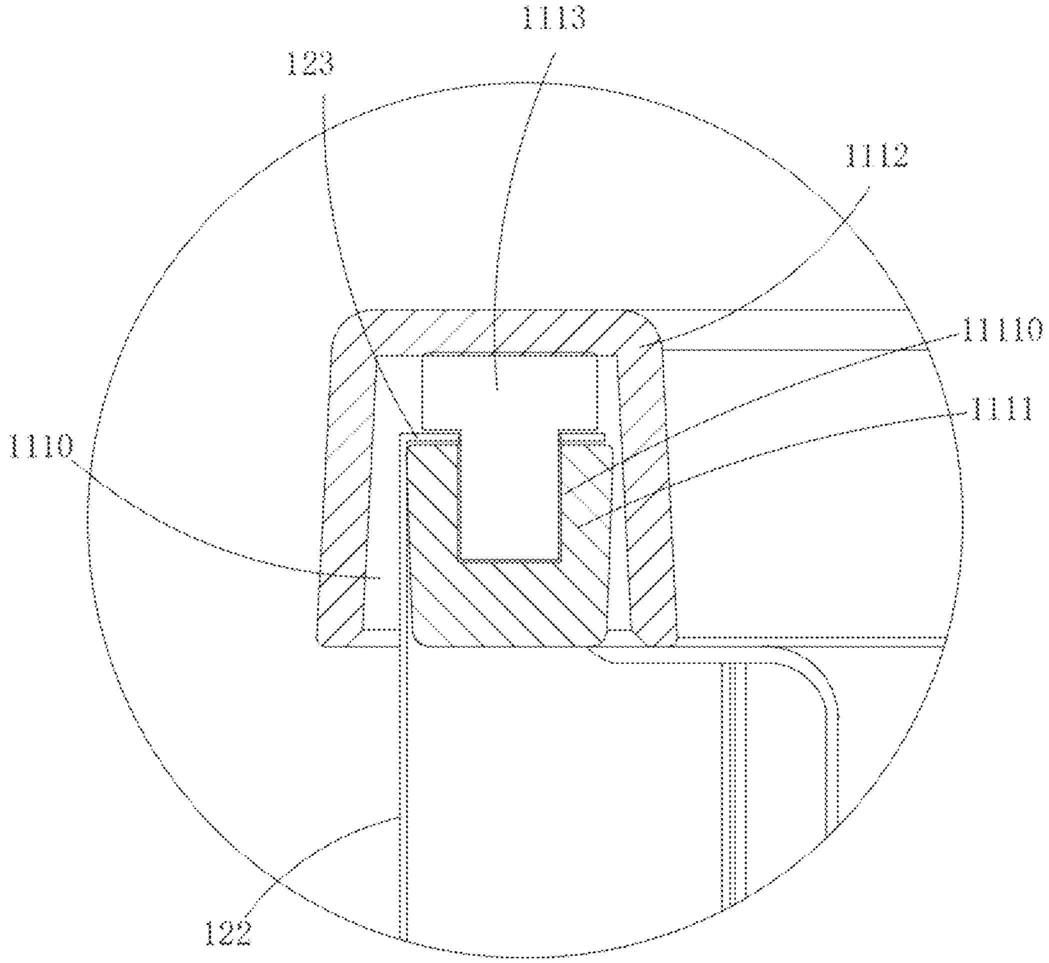
FIG. 16 is a schematic view showing the connection relationship between the fixing member and the first connection portion according to still another embodiment of the present disclosure.

To improve connection reliability between the first connection portion 123 and the fixing member 111, in some embodiments, referring to FIGS. 14 to 16, the fixing member 111 may further include a locking member 1113. The locking member 1113 may penetrate the first connection portion 123 and may be connected to the first clamping portion 1111 or the second clamping portion 1112. The locking member 1113 may lock a position of the first connection portion 123 in the clamping gap 1110 and may prevent the first connection portion 123 from disengaging from the clamping gap 1110 when the first clamping portion 1111 and the second clamping portion 1112 are not separated from each other.

In some embodiments, as shown in FIG. 15, the locking member 1113 may specifically be arranged as a columnar structure integrally formed on the first clamping portion 1111 or the second clamping portion 1112 as a one-piece structure with the first clamping portion 1111 or the second clamping portion 1112. The fixing member 111 may include a plurality of locking members 1113. The plurality of locking members 1113 may be distributed along an edge of the first clamping portion 1111 or the second clamping portion 1112. There may be only one first connection portion 123, which may be annularly arranged, and each of the plurality of locking members 1113 may penetrate the first connection portion 123.

In other embodiments, as shown in FIG. 14, the locking member 1113 may include a fixing pin 11131 and a locking cap 11132. The fixing pin 11131 may be integrally formed on the first clamping portion 1111 as a one-piece structure. The fixing pin 11131 may penetrate the first connection portion 123. A fixing hole 11110 may be formed in the fixing pin 11131. The locking cap 11132 may be inserted in the fixing hole 11110. A maximum diameter of the locking cap 11132 may be larger than a diameter of the fixing pin 11131. The locking cap 11132 may prevent the first connection portion 123 from disengaging from the fixing pin 11131.

In still other embodiments, referring to FIG. 16, a fixing hole 11110 may be formed on the first clamping portion 1111. The locking member 1113 may be arranged penetrating the first connection portion 123, and the locking member 1113 may be inserted in the fixing hole 11110 by a clearance fit or an interference fit. When the first clamping portion 1111 and the second clamping portion 1112 are connected to each other, the locking member 1113 may be prevented from disengaging from the fixing hole 11110, that is, an anti-detachment effect on the first connection portion 123 may be achieved. Furthermore, a plurality of fixing holes 11110 may be formed on the first clamping portion 1111. The plurality of fixing holes 11110 may be distributed along an edge of the first clamping portion 1111. The flexible enclosure 12 may include a plurality of first connection portions 123 formed on the enclosing member 122, and the fixing member 111 may include a plurality of locking members 1113. Each locking member 1113 may penetrate a respective one of the first connection portions 123 and may be inserted in one of the fixing holes 11110.

Figure 17:
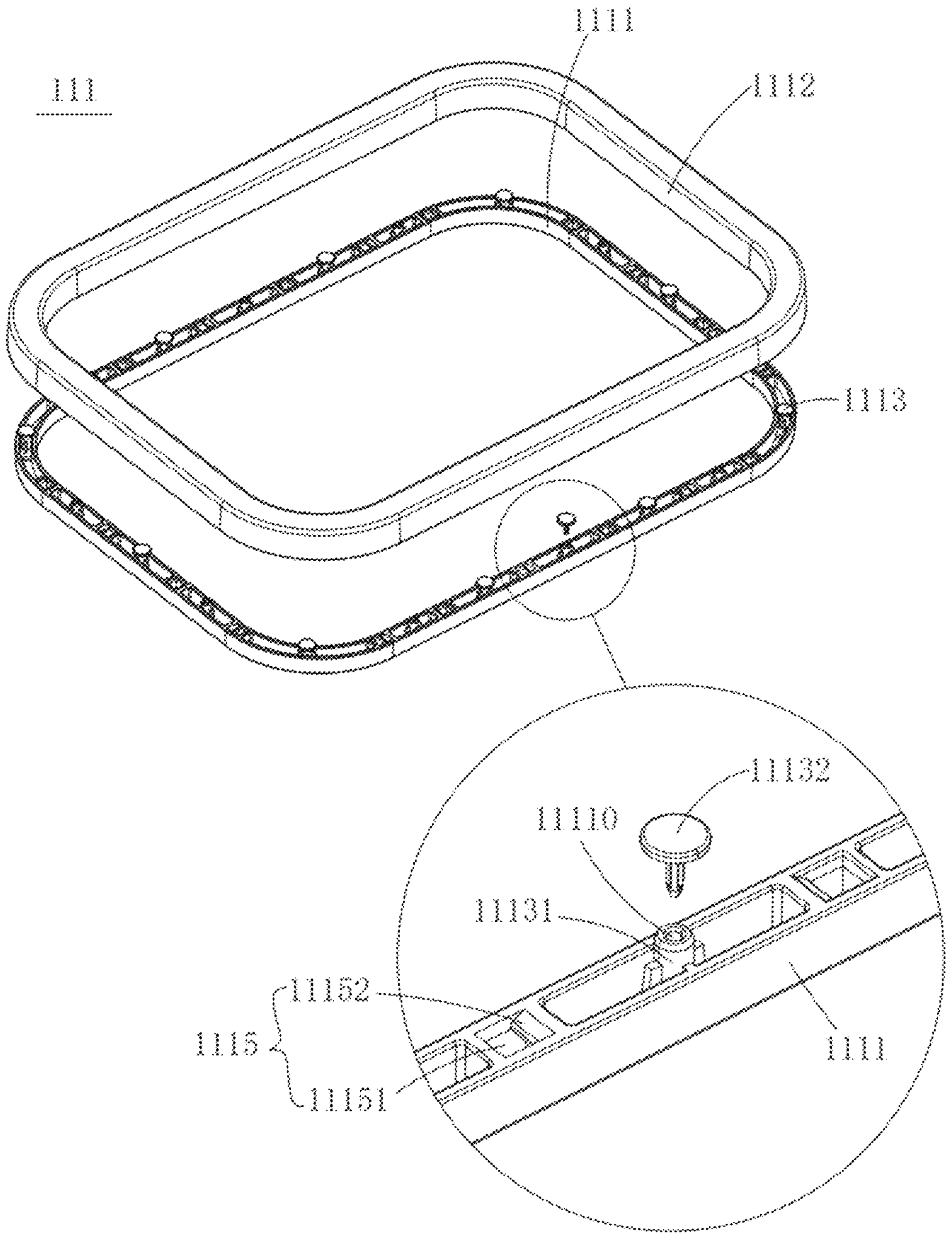
FIG. 17 is an exploded view of the fixing member according to an embodiment of the present disclosure.
Figure 18:
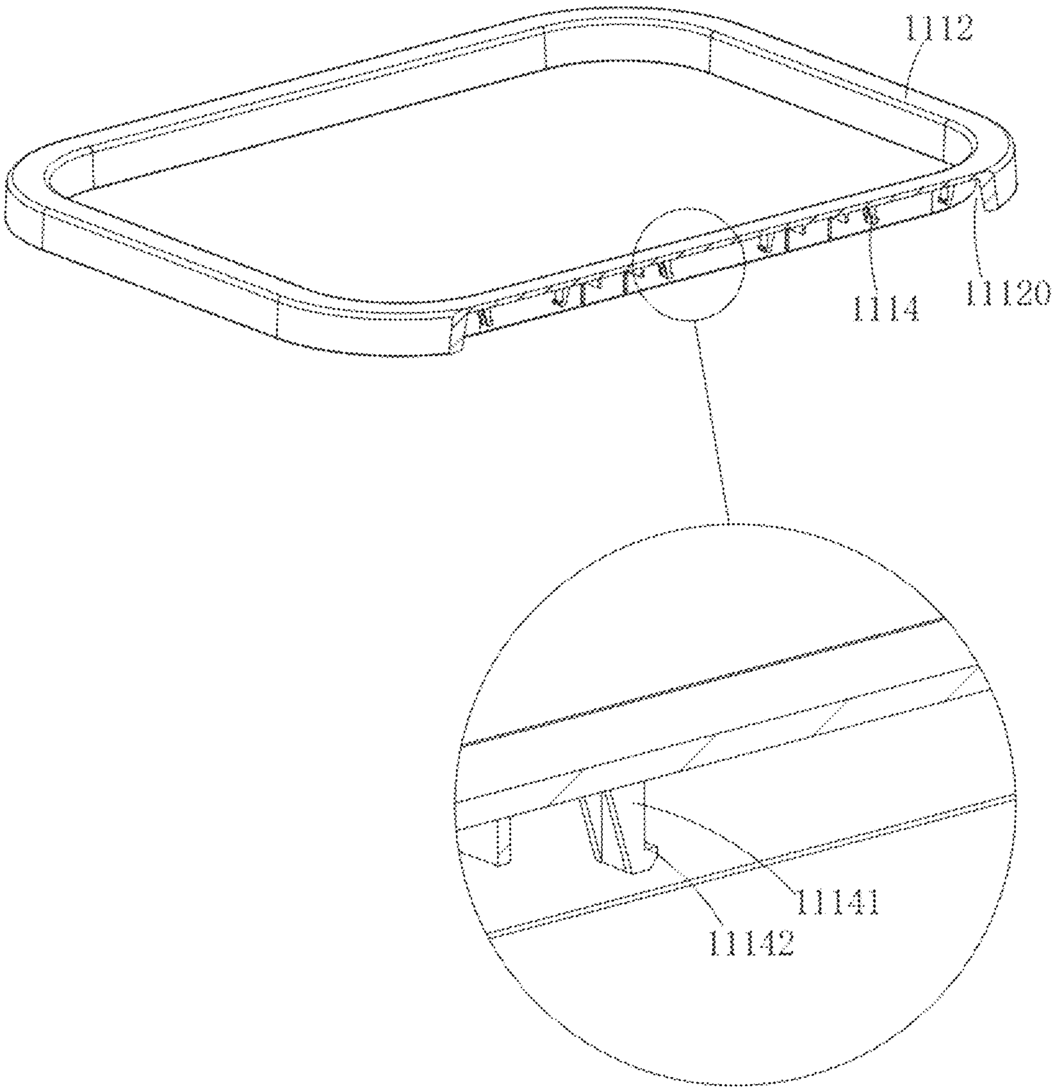
FIG. 18 is a structural view of a second clamping portion according to an embodiment of the present disclosure.
Figure 19:
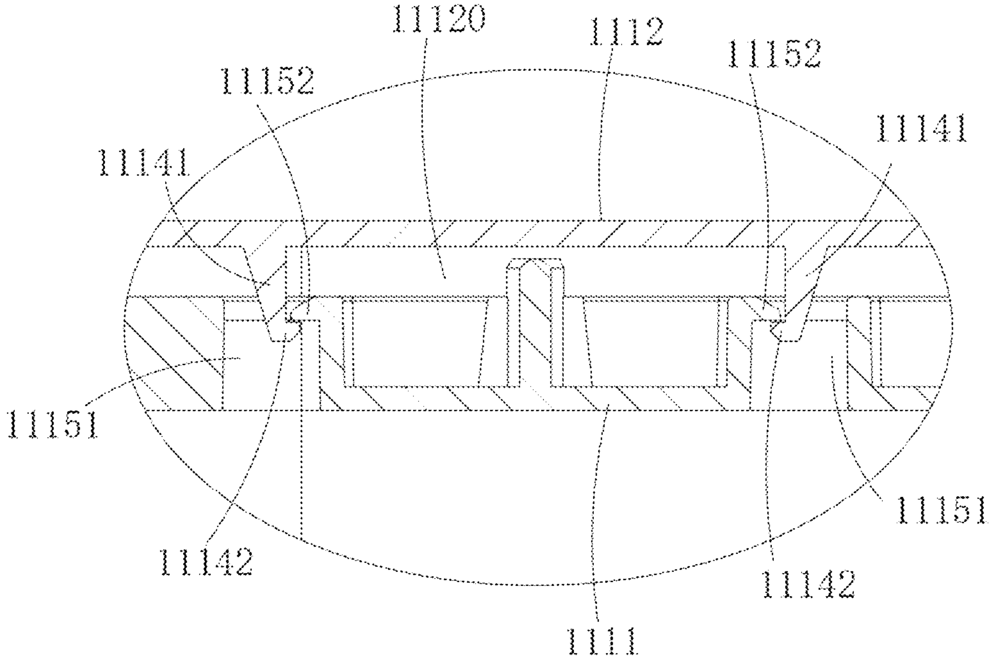
FIG. 19 is a structural view of a first clamping portion and the second clamping portion according to an embodiment of the present disclosure, with the first clamping portion engaged with the second clamping portion.

Regarding the detachable connection between the first clamping portion 1111 and the second clamping portion 1112, in some embodiments, referring to FIGS. 17 to 19, the first clamping portion 1111 and the second clamping portion 1112 may be connected with each other in a snap-fit manner. Therefore, the fixing member 111 may further include a first engagement member 1114 and a second engagement member 1115. The first engagement member 1114 may be formed on one of the first clamping portion 1111 and the second clamping portion 1112, and the second engagement member 1115 may be formed on the other of the first clamping portion 1111 and the second clamping portion 1112. The first engagement member 1114 and the second engagement member 1115 may be engaged with each other in a snap-fit manner.

Specifically, the first engagement member 1114 may include an extension portion 11141 and a first engagement portion 11142 formed on the extension portion 11141. The extension portion 11141 may undergo a certain degree of elastic deformation. The second engagement member 1115 may include an engagement groove 11151 and a second engagement portion 11152 formed on one side of the engagement groove 11151. The extension portion 11141 may be inserted in or pass through the engagement groove 11151, so that the first engagement portion 11142 may pass over the second engagement portion 11152 and then elastically be engaged with the second engagement portion 11152. During a process of the extension portion 11141 being inserted in or passing through the engagement groove 11151, the first engagement portion 11142 may abut against an upper side of the second engagement portion 11152, forcing the extension portion 11141 to bend and deform until the first engagement portion 11142 passes over the second engagement portion 11152. Then, the extension portion 11141 may return to an original shape, and the first engagement portion 11142 may be placed under the second engagement portion 11152, achieving the snap-fit engagement between the first engagement portion 11142 and the second engagement portion 11152.

In other embodiments, the first clamping portion 1111 and the second clamping portion 1112 may also be connected with each other by bolts.

In some embodiments, referring to FIGS. 14 to 17, the second clamping portion 1112 may define an accommodation groove 11120 penetrating through a bottom portion of the second clamping portion 1112 along an edge of the second clamping portion 1112. The first clamping portion 1111 may be arranged in the accommodation groove 11120, so that the second clamping portion 1112 may cover the locking member 1113, the first engagement structure 1114, and the second engagement structure 1115, and so as to prevent too many pore structures on a surface of the fixing member 111 from being exposed, thereby maintaining an aesthetic appearance of the fixing member 111.

Figure 3:
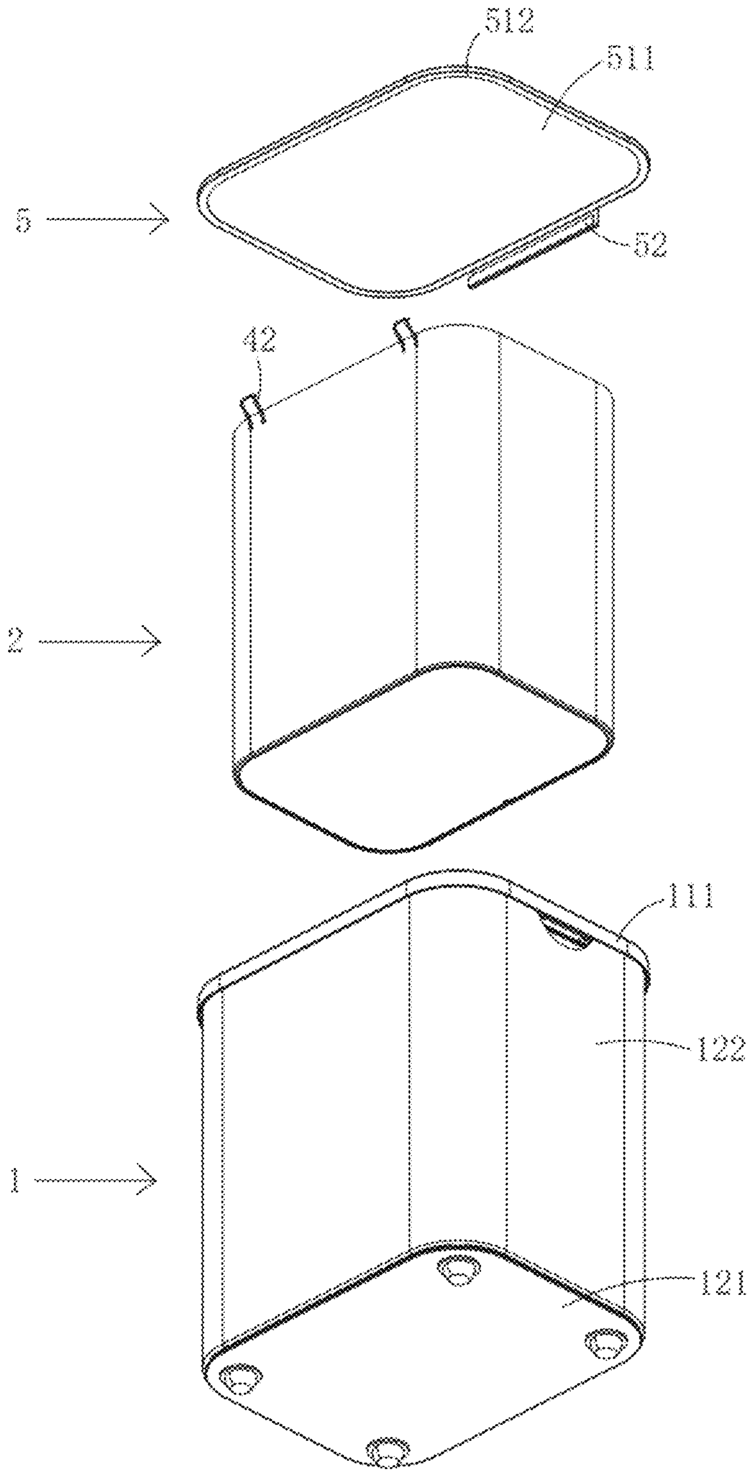
FIG. 3 is an exploded view II of the towel heating barrel according to an embodiment of the present disclosure.

Furthermore, in some embodiments, as shown in FIGS. 1 to 3, the towel heating barrel may further include a top cover 5. A first opening 101 communicating the first accommodation cavity 100 with an exterior of the outer container 1 may be formed at a top end of the outer container 1. The top cover 5 may movably mounted on the outer container 1 and may open or cover the first opening 101. A second opening 201 communicating the first accommodation cavity 100 and the second accommodation cavity 200 may be formed on the inner container 2. The second opening 201 may be arranged corresponding in position to the first opening 101. Therefore, after the top cover 5 opens the first opening 101, the second opening 201 may be simultaneously exposed, allowing the user to place towels in the second accommodation cavity 200. Furthermore, the top cover 5 may serve a protective function, preventing situations where the user gets scalded by touching the heating mechanism 3 during operation.

Specifically, the first opening 101 may be formed on the fixing member 111, and simultaneously the top cover 5 may be movably connected to the fixing member 111. Correspondingly, each of the first clamping portion 1111 and the second clamping portion 1112 may be annularly arranged. The annular second clamping portion 1112 may define the first opening 101 communicating the first accommodation cavity 100 with the exterior of the outer container 1. The top cover 5 may be at least partially clamped and fixed in the clamping gap 1110.

As shown in FIGS. 2 and 3, the top cover 5 may include a cover body 51 and a second connection portion 52 connected to the cover body 51. The cover body 51 may open or close the first opening 101. The second connection portion 52 may be flexible. The second connection portion 52 may be connected to the enclosing member 122 or to the fixing member 111.

For example, in some embodiments, the second connection portion 52 may be at least partially located in the clamping gap 1110. That is, the first clamping portion 1111 and the second clamping portion 1112 may cooperatively clamp and fix the first connection part 123 and the second connection portion 52.

For example, in other embodiments, the second connection portion 52 may be sewn to the enclosing member 122.

For example, in yet other embodiments, the second connection portion 52 may be connected to the fixing member 111 in a snap-fit manner.

In some embodiments, the cover body 51 may include a cover plate 511, an edge wrapping member 512, and a lifting member 513. A material of the cover plate 511 may be or may include a rigid material to avoid soft deformation. The edge wrapping member 512 may be arranged surrounding a periphery of the cover plate 511 and connected to the periphery of the cover plate 511. The second connection portion 52 may be at least partially clamped between the cover plate 511 and the edge wrapping member 512, and the lifting member 513 may be at least partially clamped between the cover plate 511 and the edge wrapping member 512. The user may apply force to the cover plate 511 through the lifting member 513 to make the cover plate 511 swing about a movable part of the second connection portion 52.

For example, in some embodiments, the edge wrapping member 512 may be made of metal. The edge wrapping member 512 may clamp the second connection portion 52 and the lifting member 513 tightly through a rigid structure of the metal.

For example, in other embodiments, the edge wrapping member 512 may be made of fabric, and the cover plate 511 may be made of plastic. An outer side of the cover plate 511 may be wrapped with a layer of fabric. The edge wrapping member 512 may be sewn to the layer of fabric on an outer side of the cover plate 511, and each of the second connection portion 52 and the lifting member 513 may also be sewn and fixed between the layer of fabric and the edge wrapping member 512.

In other embodiments, the inner container 2 and the outer container 1 may have a fixed connection structure, that is, the aforementioned hanging assembly 4 may not be provided between the inner container 2 and the outer container 1. The inner container 2 may be fixedly connected to the fixing member 111, causing the first opening 101 and the second opening 201 to be coincided with each other.

In other embodiments, the heating mechanism 3 may also be distributed in the outer container 1 to also heat the first accommodation cavity 100. The flexible enclosure 12 may include the base plate 121 and the enclosing member 122. The electric heating wire 31 may be distributed both on the base plate 121 and in the inner container 2, with almost no impact on an overall appearance of the towel heating barrel. Both the inner container 2 and the outer container 1 may possess heating functions simultaneously, which can be used to heat different types of towels, for example, heating dry towels in the inner container 2 and heating wet towels in the outer container 1.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A towel heating barrel, comprising:

a fixing member;

a flexible enclosure, connected to the fixing member, wherein at least a portion of the flexible enclosure is flexible and has a folded state and an unfolded state; when the flexible enclosure is in the unfolded state, a first accommodation cavity is formed in the flexible enclosure; and a plurality of support rods, wherein each of the plurality of support rods is detachably connected to the fixing member or the flexible enclosure, and at least a portion of each of the plurality of support rods is configured to be arranged in the first accommodation cavity, and the plurality of support rods are configured to keep the flexible enclosure in the unfolded state;

wherein, the flexible enclosure has an inner surface facing the first accommodation cavity; the towel heating barrel further comprises a plurality of rod sleeves, the number of the plurality of rod sleeves is equal to the number of the plurality of support rods; the plurality of rod sleeves are connected to the inner surface of the flexible enclosure;

for each of the plurality of rod sleeves, a receiving cavity is formed between the rod sleeve and the inner surface of the flexible enclosure; the first accommodation cavity is entirely located inside the first accommodation cavity;

when the plurality of support rods are connected to the flexible enclosure, the plurality of support rods are respectively received in the plurality of rod sleeves, the plurality of support rods are protruding with respect to the inner surface of the flexible enclosure and are received inside the first accommodation cavity.

2. The towel heating barrel according to claim 1, wherein the flexible enclosure comprises a base plate and an enclosing member, the inner surface is a surface of the enclosing member; the enclosing member comprises a flexible material and is connected between the fixing member and the base plate, an upper end of each of the plurality of support rods is connected to or abuts against the fixing member, and a lower end of each of the plurality of support rods is connected to or abuts against the base plate.

3. The towel heating barrel according to claim 2, wherein when each of the plurality of support rods is connected to the enclosing member, the flexible enclosure is in the unfolded state.

4. The towel heating barrel according to claim 2, wherein the base plate comprises a support body and an outer wrapping member wrapping the support body, and the enclosing member and the outer wrapping member are sewn to each other.

5. The towel heating barrel according to claim 1, wherein the plurality of rod sleeves are sewn to the inner surface of the flexible enclosure.

6. The towel heating barrel according to claim 1, wherein an inlet/outlet of the receiving cavity is formed at an upper end of each of the plurality of rod sleeves;

the towel heating barrel further comprises a plurality of anti-detachment members, one end of each of the plurality of anti-detachment members is connected to the fixing member or the flexible enclosure, the other end of each of the plurality of anti-detachment members is detachably connected to a respective one of the plurality of rod sleeves to open or cover the inlet/outlet.

7. The towel heating barrel according to claim 1, wherein a first opening is formed in the fixing member, the first accommodation cavity and an exterior of the flexible enclosure are communicated with each other via the first opening;

the towel heating barrel further comprises a top cover, wherein the top cover is movably mounted to the fixing member and is configured to open or cover the first opening.

8. The towel heating barrel according to claim 1, further comprising an inner container and a heating mechanism, wherein the inner container is located in the first accommodation cavity and detachably connected to the fixing member or the flexible enclosure, a second accommodation cavity is formed in the inner container, and the heating mechanism is configured to heat the second accommodation cavity;

wherein, the second accommodation cavity has a second cavity opening through which a towel is capable of being placed to or taken out of the second accommodation cavity; the first accommodation cavity has a first cavity opening through which the inner container is capable of being placed into or taken out of the first accommodation cavity; the first cavity opening and the second cavity opening have a same opening direction;

the fixing member or the flexible enclosure is arranged with a first connection member at a position near the first cavity opening; the inner container is arranged with a second connection member at a position near the second cavity opening; the first connection member and the second connection member are detachably connected to each other to enable the inner container to be connected to or detached off from the fixing member of the flexible enclosure.

9. A towel heating barrel, comprising:

a fixing member;

a flexible enclosure, connected to the fixing member, wherein at least a portion of the flexible enclosure is flexible and has a folded state and an unfolded state; when the flexible enclosure is in the unfolded state, a first accommodation cavity is formed in the flexible enclosure;

a plurality of support rods, wherein each of the plurality of support rods is detachably connected to the fixing member or the flexible enclosure, and at least a portion of each of the plurality of support rods is configured to be arranged in the first accommodation cavity, and the plurality of support rods are configured to keep the flexible enclosure in the unfolded state; and a plurality of rod sleeves, wherein the number of the plurality of rod sleeves is the same as the number of the plurality of support rods, the plurality of rod sleeves are connected to an inner side of the flexible enclosure, a receiving cavity is formed between each of the plurality of rod sleeves and the flexible enclosure, or each of the plurality of rod sleeves encloses to form the receiving cavity, and each of the plurality of support rods is configured to be arranged in the receiving cavity;

wherein, an inlet/outlet of the receiving cavity is formed at an upper end of each of the plurality of rod sleeves;

the towel heating barrel further comprises a plurality of anti-detachment members, one end of each of the plurality of anti-detachment members is connected to the fixing member or the flexible enclosure, the other end of each of the plurality of anti-detachment members is detachably connected to a respective one of the plurality of rod sleeves to open or cover the inlet/outlet; and each of the plurality of anti-detachment members is detachably connected to a respective one of the plurality of rod sleeves by a hook-and-loop fastener.

* * * * *